United States Patent Office 2,762,801
Patented Sept. 11, 1956

2,762,801
BIS-TRIAZINYLAMINO STILBENE COMPOUNDS

Heinrich Häusermann, Basel, Switzerland, assignor to J. R. Geigy A.-G., Basel, Switzerland, a Swiss firm No Drawing. Application November 24, 1954,
Serial No. 471,078

Claims priority, application Switzerland
November 26, 1953

5 Claims. (Cl. 260—249.6)

The present invention is concerned with blue fluorescing bis-triazinylamino stilbene compounds having good water solubility which, because of their good affinity to cellulose and their high intensity of fluorescence, have

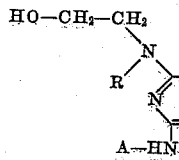 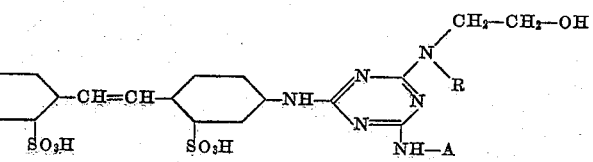

an improved maximal brightening effect. It is also concerned with a process for the production thereof. In addition, it is concerned with the use of such compounds for the optical brightening of cellulose in the form of fibres, textiles, household linen and paper, the production and use of washing and cleaning agents which contain the compounds according to the invention as optical brightening agents as well as the attainment of cellulose material brightened with the aid of these compounds and the material so brightened.

4.4′-bis-triazinylamino stilbene-2.2′-disulphonic acids or the water soluble salts thereof which are further substituted in the triazine rings by at least one and preferably two amino groups which may be organically substituted, have attained a great importance due to their violet blue to blue fluorescence and their good affinity to cellulose as optical brightening agents in the textile and paper industries as well as for laundering purposes in the household. Today, according to the intended use, very definite demands are made of these compounds with regard to water solubility, affinity to the fibre, shade of fluorescence light, wet fastness on the fibre, etc. The soap-saving textile finishing industry for example requires very substantive brightening agents which have good water solubility and good wet fastness, the soap and washing agents industry on the other hand requires such optical brightening agents as additives to the washing agents for use in the household wash which, on repeated use, will not undesirably discolour the textiles. Always however, is the greatest possible maximal brightening desired so that also the more strongly yellow coloured goods can be effectively brightened. As however, the 4.4′-bis-triazinylamino stilbene-2.2′-disulphonic acids have a yellow self colour, on increasing the concentration on the fibre in order to compensate a stronger yellow tinge in the goods in daylight by the blue fluorescence light, a point is soon reached where the yellow self colour of the agent becomes visible thus making it impossible to increase the white content. The maximal brightening effect of such a water soluble optical brightening agent which can be obtained for a given amount of substance is dependent in reverse ratio on its self colour and is dependent in direct ratio on the intensity of fluorescence, the shade of fluorescence light and the substantivity of the compound under the conditions in which it is used.

It has now been found that new bis-triazinylamino stilbene compounds which dissolve well in water, have an intensive blue fluorescence and very good affinity to cellulose and which are distinguished by an improved maximal brightening on cellulose fibres are obtained if the known condensation products from 1 mol of 4.4′-diaminostilbene-2.2′-disulphonic acid and 2 mols of cyanuric halide or the aqueous solution of their salts are condensed with 2 mols of a primary aromatic amine of the benzene series which may contain non-ionogenic ring substituents and with 2 mols of the secondary N-methyl or N-ethyl ethanolamine. The condensation is performed in steps, in any order desired, and in the presence of agents which neutralise the mineral acid, but must be so performed that symmetrical compounds of the general formula:

are obtained. In this formula

R represents an aliphatic hydrocarbon radical with 1 to 2 carbon atoms and
A represents a phenyl radical, if desired non-ionogenically further substituted—preferably by chlorine, alkyl or alkoxy groups.

The condensation of the 4.4′-bis-[4.6-dihalogen-1.3.5-triazinyl-(2)-amino]-stilbene-2.2′-disulphonic acid can be performed in an aqueous solution of the alkali metal salts by known methods at 10–50° C. in the first step and at 90–100° C. in the second step. Aminobenzene, 2- and particularly 3-methyl-1-aminobenzene, 3-chloro-1-aminobenzene, 2- or 4- and particularly 3-methoxy-1-aminobenzene, 2-ethoxy-1-aminobenzene, 4-phenoxy-1-aminobenzene, 2.5-dimethyl-1-aminobenzene, 3-methoxy-4-methyl-1-aminobenzene for example can be used as primary aromatic amines of the benzene series. It is advantageous first to condense 2 mols of the aromatic amine at 10–50° C. in the presence of the necessary amount of sodium acetate, sodium bicarbonate or sodium carbonate as agent neutralising the mineral acid and then to condense 2 mols of the aliphatic amine at 90–100° C. in which condensation an excess of amine can be used as acid binding agent.

The new compounds are obtained in the form of their more or less yellow coloured alkali salts which can be easily isolated. After drying they have relatively good water solubility, a good affinity to cellulose fibres in aqueous and also in alkaline solutions containing soaps or detergents and they have an improved bleaching effect compared with the comparable monoethanolamine, diethanolamine and morpholine compounds. In addition they have better water solubility than the last above named compounds. Due to the solubility they can be put to good use both in the textile finishing industry as well as in the manufacture of washing agents.

The following examples illustrate the invention without limiting it in any way. Parts are given as parts by weight and the temperatures are in degrees centigrade.

*Example 1*

18.5 parts of cyanuric chloride are dissolved in 120 parts of acetone and the solution is added to a mixture of 200 parts of ice and 200 parts of water. The cyanuric chloride suspension so obtained is reacted while stirring in the usual way with a pH value of 5.6 at 0–5° with a solution of 20.7 parts of the sodium salt of 4.4'-diamino-stilbene-2.2'-disulphonic acid in 200 parts of water and a solution of 5.3 parts of sodium carbonate. The solution of the sodium salt of 4.4'-bis-[4.6-dichloro-1.3.5-triazinyl-(2)-amino]-stilbene-2.2'-disulphonic acid is stirred at 15–25° with 9.3 parts of aniline and the pH value is kept between 6.5 and 7.5 by the slow addition of a solution of 5.3 parts of sodium carbonate in 25 parts of water. After no more aniline can be traced, so much N-methyl-ethanolamine is added dropwise until the reaction mixture turns phenolphthalein paper red whereupon the mixture is gradually heated to 90–95° and stirred for 1½ hours at this temperature, the reaction being kept always phenolphthalein alkaline with N-methylmonoethanolamine. In all, 15–20 parts of N-methylethanolamine are needed. While heating, the acetone is distilled off through a sloping condenser. The resulting sodium salt of 4.4'-bis-[4 - phenylamino-6-(β-hydroxyethylmethylamino)-1.3.5-triazinyl-(2)-amino]-stilbene-2.2'-disulphonic acid is separated by salting out with 75 parts of sodium chloride. The product is washed with 5% sodium chloride solution and dried in the vacuum at 70–90°. The new stilbene compound forms a yellowish powder which is soluble in water. An aqueous solution of the product has a blue fluorescence in daylight.

If cellulose materials which appear colourless to weakly yellowish are treated with such an aqueous solution, then the materials so treated appear to be much lighter than before the treatment. Due to its high maximal brightening, the product is particularly suitable for textile finishing.

If in the above example, 10.7 parts of o-toluidine, 10.7 parts of m-toluidine, 12.75 parts of m-chloraniline, 12.3 parts of m-anisidine, 12.3 parts of o-anisidine or 12.1 parts of p-xylidine are used instead of 9.3 parts of aniline, then compounds with very similar properties are obtained.

*Example 2*

18 parts of N-ethyl-monoethanolamine are added over 30 minutes at 5–10° to 71 parts of the sodium salt of 4.4' - bis-[4.6-dichloro-1.3.5-triazinyl-(2)-amino]-stilbene-2.2'-disulphonic acid in 1500 parts of water. The mixture is stirred for 5 hours at 30–40° and the reaction is kept weakly alkaline to brilliant yellow paper by the slow addition dropwise of a solution of 11 parts of sodium carbonate in 50 parts of water. 24.6 parts of p-methoxy aniline are then added and the temperature is raised to 90–95°. The mixture is stirred for 4 hours at this temperature and the reaction is kept neutral to litmus paper with 15% sodium carbonate solution. Finally so much sodium carbonate solution 15% is added until the mixture becomes alkaline to phenolphthalein. The product is then salted out with 150 parts of sodium chloride, and, after washing with 5% salt solution, it is dried at 70–90° in the vacuum. The disodium salt of 4.4'-bis-[4-(p-methoxyphenylamino)-6-(N-ethyl-β-hydroxyethylamino)-1.3.5-triazinyl-(2)-amino]-stilbene-2.2'-disulphonic acid is so obtained as a yellowish water soluble powder. In aqueous solution the compound has a blue and in alcoholic solution a violet fluorescence in daylight. This compound is excellently suitable as an additive to washing liquors for white wash.

Somewhat stronger but more redly fluorescing products are obtained if in this example the 24.6 parts of p-anisidine are replaced by 18.6 parts of aniline, 24.6 parts of m-anisidine or 26 parts of m-phenetidine. The latter compounds are specially suitable for textile finishing.

*Example 3*

71 parts of the disodium salt of 4.4'-bis-[4.6-dichloro-1.3.5 - triazinyl - (2)-amino]-stilbene-2.2'-disulphonic acid dissolved in 1500 parts of water are stirred well at 15–25° with 27.4 parts of 3-methoxy-4-methylaniline until the amine disappears. The liberated hydrochloric acid is continually neutralised by the gradual addition of a solution of 10.6 parts of calcinated sodium carbonate in 50 parts of water. When no more amine can be traced, 18 parts of N-methyl-monoethanolamine are added, the mixture is slowly heated to 90–95° and stirred at this temperature for 1½ hours. The reaction is kept always weakly phenolphthalein alkaline by the addition of a 15% sodium carbonate solution. The reaction product is isolated as described in Examples 1 and 2, washed and dried. The disodium salt of 4.4'-bis-[4-(3-methoxy-4-methylphenylamino) - 6 - (N - methyl-β-hydroxyethylamino)-1.3.5-triazinyl-(2)-amino]-stilbene-2.2'-disulphonic acid is obtained as a yellowish water soluble powder. The product has similar properties to those of the compounds obtained according to Example 1.

Very valuable products are also obtained if in this example the 27.4 parts of 3-methoxy-4-methyl aniline are replaced by 28.3 parts of 3-chloro-4-methyl aniline or by 28.3 parts of 3-chloro-2-methyl aniline.

*Example 4*

A solution of 15.95 parts of p-anisidine chlorohydrate is added in the course of over one hour at 15–20° while stirring well to 35.5 parts of the disodium salt of 4.4'-bis-[4.6 - dichloro - 1.3.5-triazinyl-(2)-amino]-stilbene-2.2'-disulphonic acid in 1000 parts of water. The hydrochloric acid which is liberated is neutralised by the addition of a 15% sodium carbonate solution. The pale yellowish suspension is then stirred at 25–35°, the reaction being kept neutral to litmus paper, until no free p-anisidine can be traced. 64 parts by volume of 15% sodium carbonate solution are needed. 9 parts of N-methyl-monoethanol amine are then added and the reaction mixture is condensed for 1½ hours at 90–95° as described in Example 3, the reaction being kept weakly phenolphthalein alkaline. By salting out, washing and drying, the sodium salt of 4.4'-bis-[4-(p-methoxy-phenylamino)-6 - (N - methyl-β-hydroxyethylamino)-1.3.5-triazinyl-(2)-amino]-stilbene-2.2'-disulphonic acid is obtained as a yellow water soluble powder. This product, because of its neutral white nuance, is excellently suitable as a brightening agent in washing liquors for white wash.

Compounds with similar properties are obtained if in this example the 15.95 parts of p-anisidine-chlorohydrate are replaced by 22.15 parts of p-aminodiphenyl ether chlorohydrate or 17.35 parts of o-phenetidine chlorohydrate.

*Example 5*

If in Example 1, the 9.3 parts of aniline are replaced by 15 parts of p-aminoacetanilide, then the sodium salt of 4.4'-bis-[2-(p-acetylaminophenylamino)-4-(β-hydroxyethylmethylamino) - triazinyl - (6)-amino]-stilbene-2.2'-disulphonic acid is obtained as a yellow powder. This compound also is very suitable for the brightening of cellulose fibres in spite of the fact that the maximal brightening effect of the compound is less than that of the preparation produced according to Example 1.

*Example 6*

White cotton poplin is treated for 15 minutes at 40° in a bath (liquor ratio 1:30) containing 0.005 g. of the sodium salt of 4.4'-bis-[4-phenylamino-6-(β-hydroxyethylmethylamino) - 1.3.5 - triazinyl - (2) - amino]-stilbene-2.2'-disulphonic acid obtained according to Example 1, and 2 g. of Glaubers salt per litre. After rinsing and drying, the material so treated has a much whiter appearance in daylight than before treatment.

*Example 7*

1 part of white wash such as, e. g. pillow cases, sheets, etc. are boiled for 30 minutes in 10 parts of a washing liquor which contains per litre 8 g. of one of the usual soap and perborate washing agents, which agent contains 0.03% of the sodium salt of 4.4'-bis-[4-(p-methoxyphenylamino) - 6 - (β - hydroxyethyl - methylamino)-1.3.5-triazinyl-(2)-amino]-stilbene-2.2'-disulphonic acid obtained according to Example 4. The goods are then rinsed and dried. A dazzling white wash which has no unpleasant reddish tinge is obtained.

What I claim is:
1. A bis-triazinylamino-stilbene compound which corresponds to the formula:

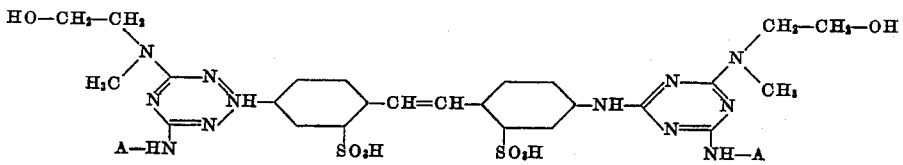

wherein A stands for a member selected from the group consisting of

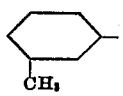

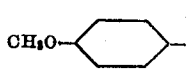

and

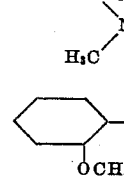

2. The bis-triazinylamino-stilbene compound having the formula:

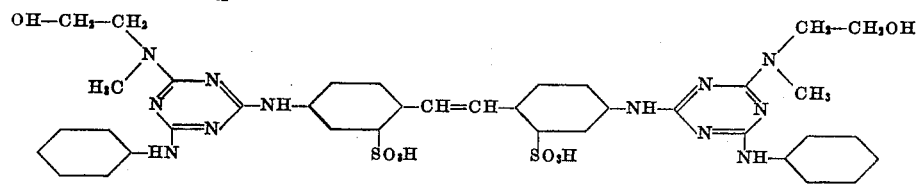

3. The bis-triazinylamino-stilbene compound having the formula:

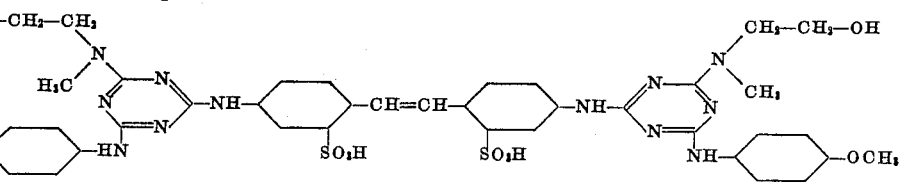

4. The bis-triazinylamino-stilbene compound having the formula:

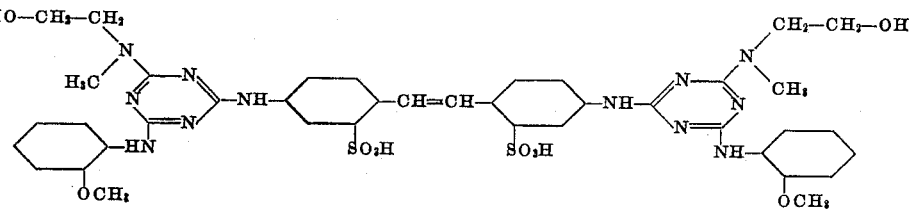

5. The bis-triazinylamino-stilbene compound having the formula:

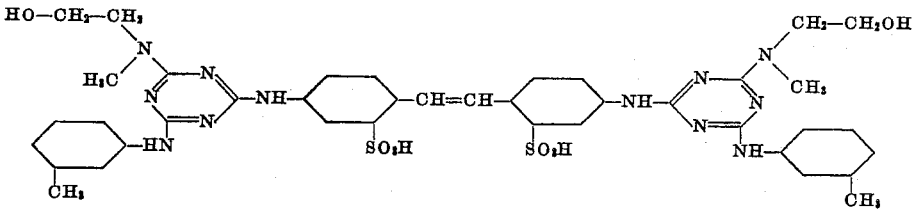

References Cited in the file of this patent
UNITED STATES PATENTS 2,667,458    Williams _____ Jan. 26, 1954

FOREIGN PATENTS 502,807    Belgium _____ 1951
624,052    Great Britain _____ 1949